United States Patent Office 3,262,956
Patented July 26, 1966

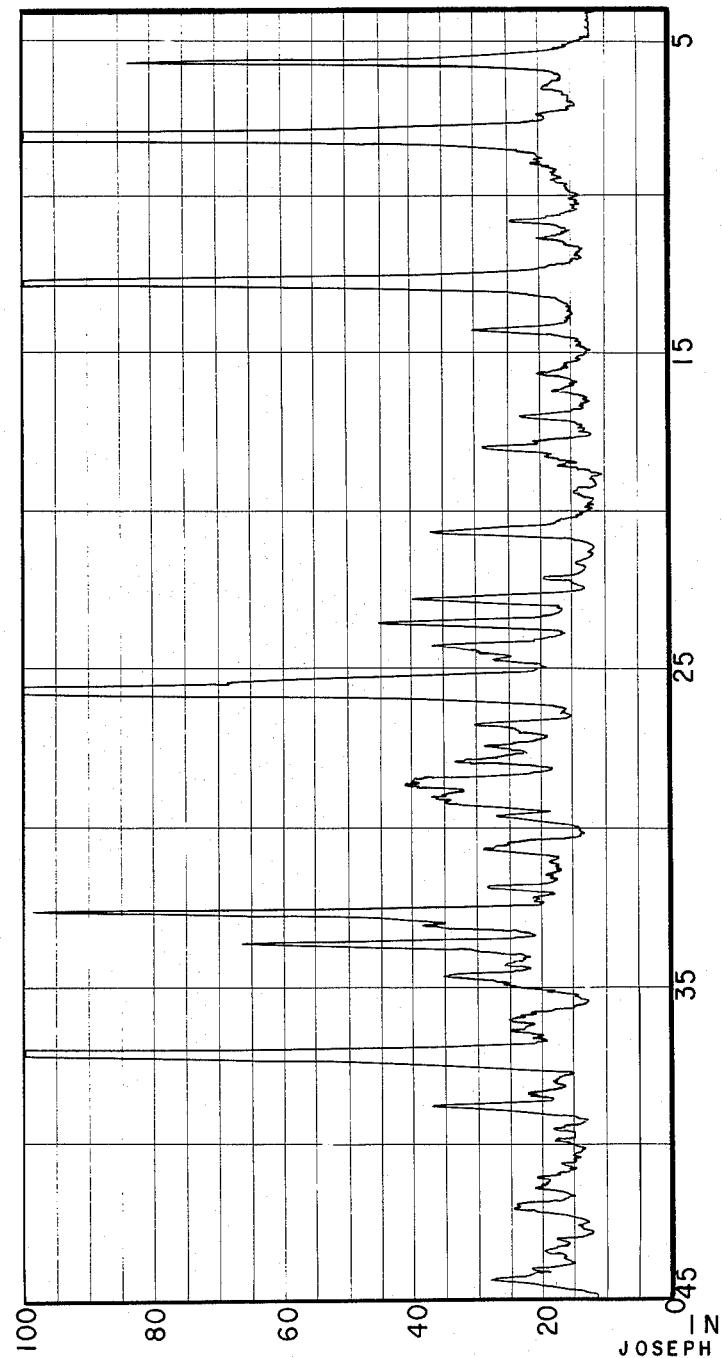

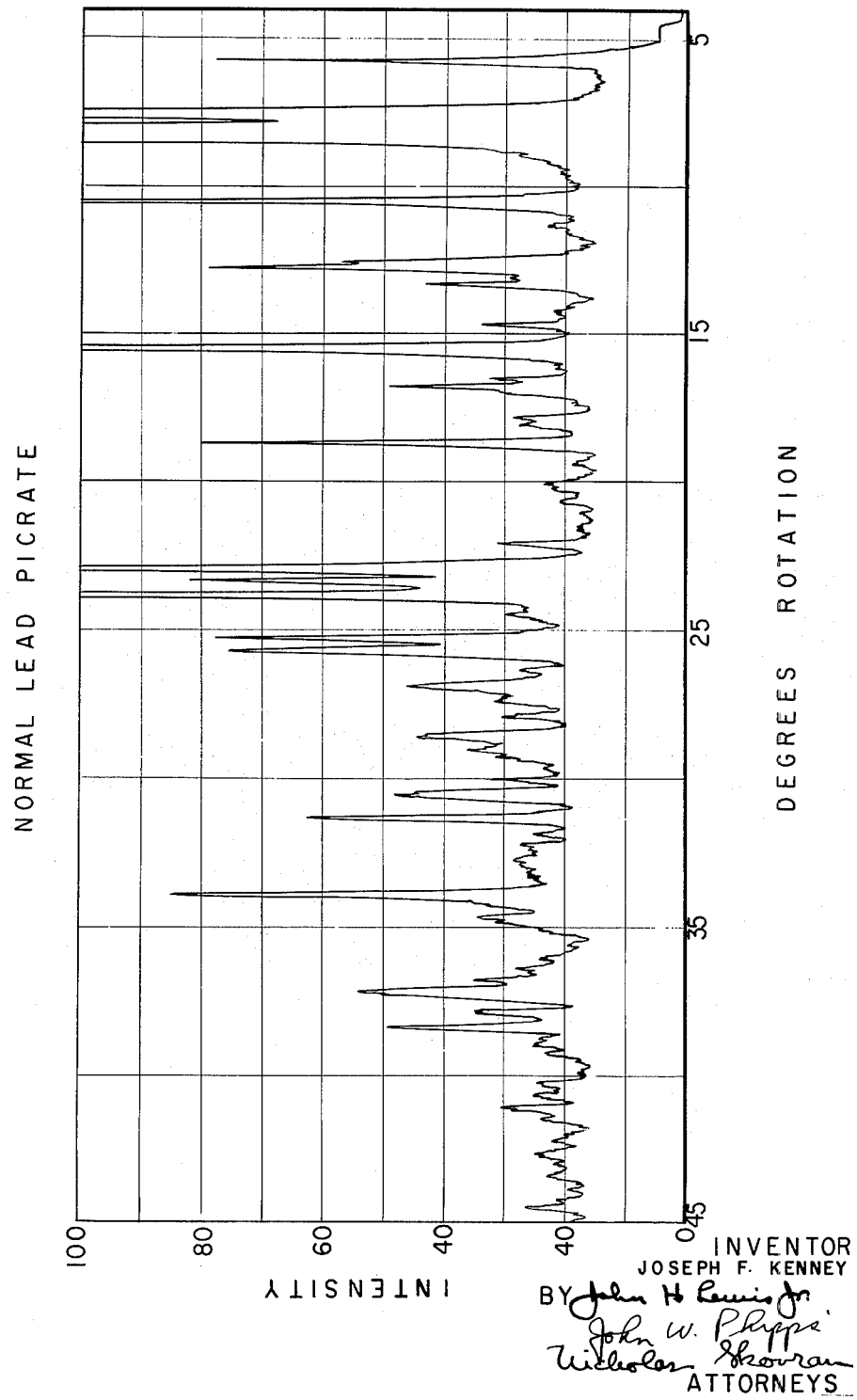
Fig. 2 — Normal Lead Picrate

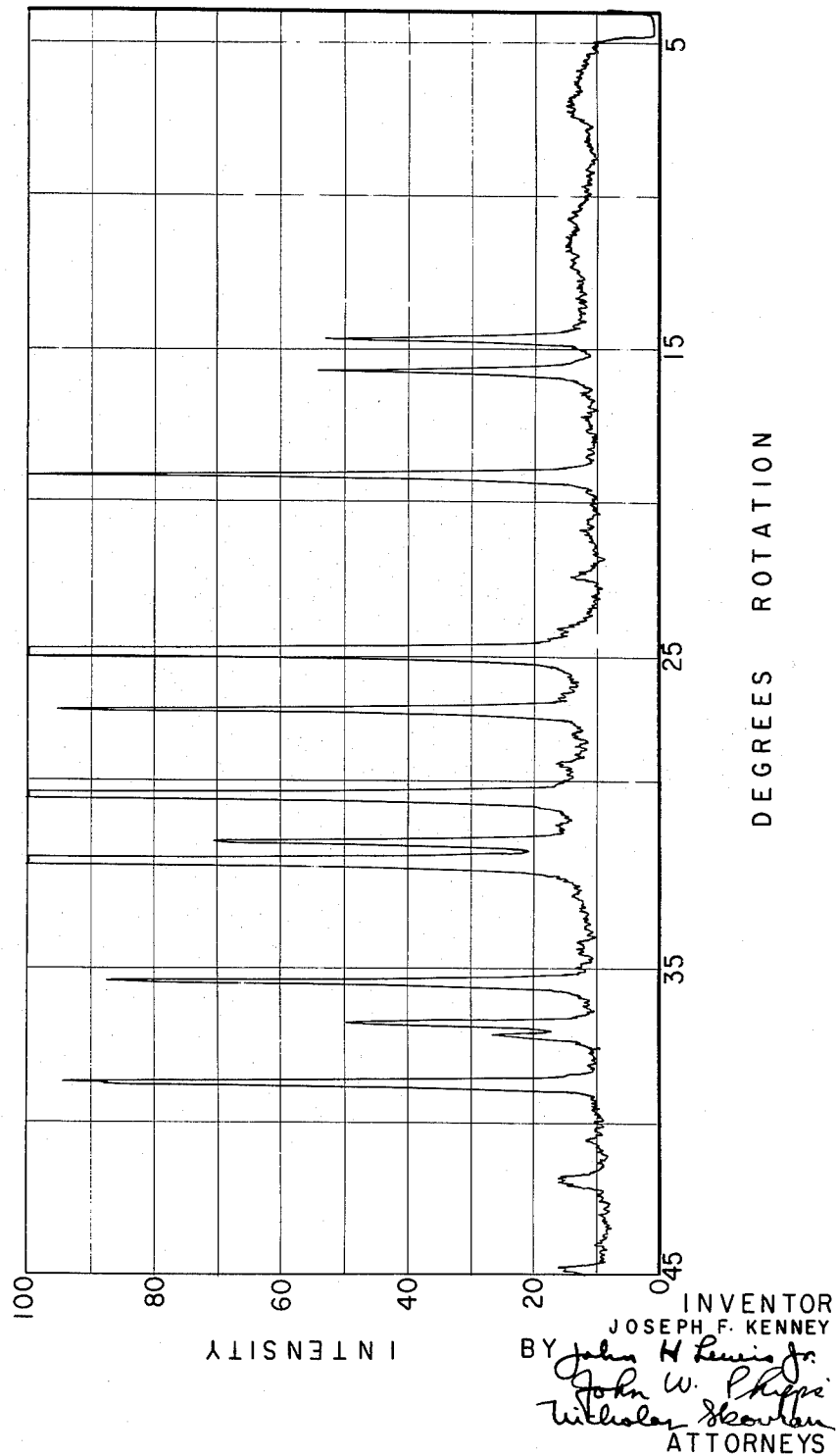
Fig. 3 LEAD HYDROXIDE

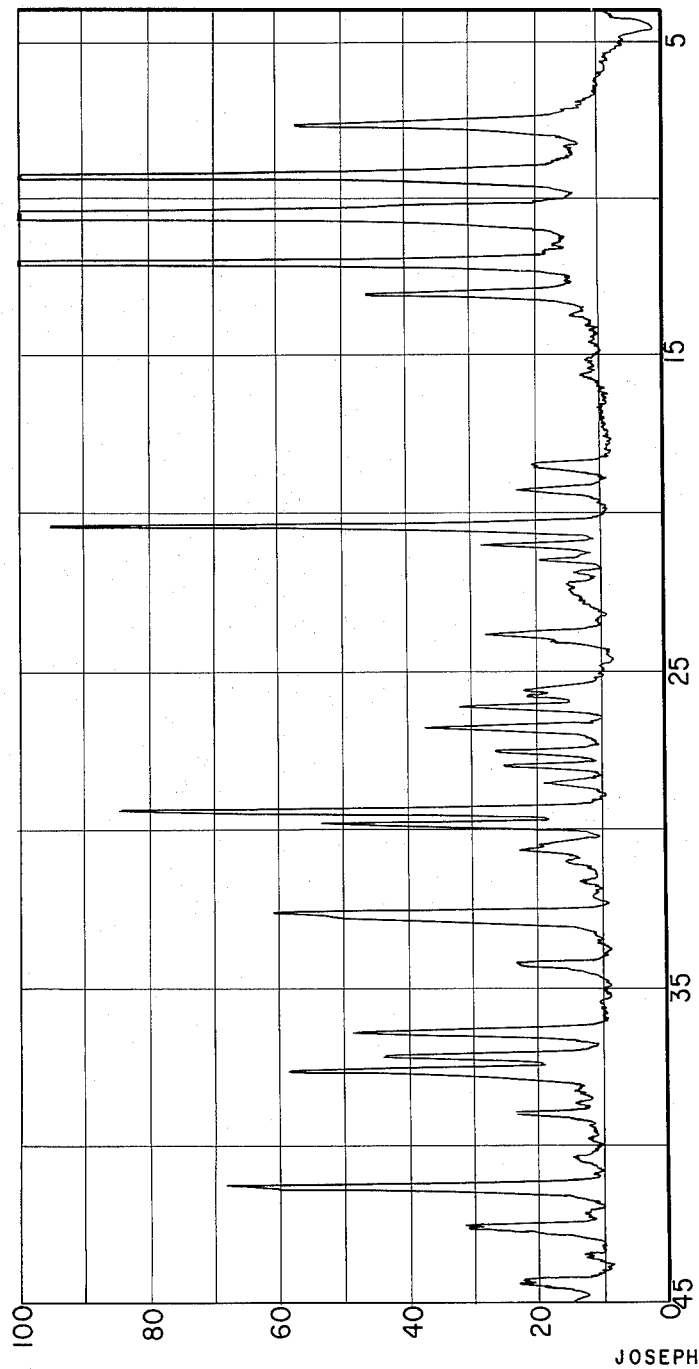

3,262,956
BASIC LEAD DOUBLE SALTS OF PICRIC ACID AND METHOD OF PREPARING SUCH SALTS
Joseph F. Kenney, Bridgeport, Conn., assignor to Remington Arms Company, Inc., Bridgeport, Conn., a corporation of Delaware
Filed Jan. 28, 1964, Ser. No. 340,705
35 Claims. (Cl. 260—435)

This application is a continuation-in-part of my co-pending application Serial Number 190,232, filed April 26, 1962, entitled, "Explosive Composition," now abandoned.

This invention relates to the production of a new series of primary explosives with properties making them useful in compositions for ammunition primers, blasting caps, squibs or electric match heads.

The primary object of this invention is the production of explosives which are relatively safe to handle from the standpoint of their sensitivity to heat or static electricity but comparatively sensitive when dry to explosion by shock or friction.

It has been known for some time that certain compounds can be precipitated to form double salts of definite chemical composition and definite crystal form having unique properties all unlike those of the individual salts or mechanical mixtures thereof. Such double salts are true compounds as distinguished from mechanical mixtures of the individual salts of the same proportions. Explosive compositions which have been so formed have been observed to have unique and desirable explosive properties.

These are believed to be clathrate inclusion compounds as such compounds are defined in such publications as "Clathrate Inclusion Compounds," Sister Martinette Hagan, Reinhold Publishing Corporation, New York, copyright 1962. Reference may be made particularly to the following statement from the preface of that book.

"Clathrates are complex compounds composed of two or more components. They differ from other complex compounds in that the molecules of their components are associated without ordinary chemical bonding. In each case there is complete enclosure of the molecules of one component in a suitable structure which has been formed by the molecules of the other. Clathrate compounds are now emerging on the chemical scene to take a place of increasing importance. Their formation is novel, and their properties are unique. When forming they appear to disdain the normal types of bonding and seldom do they fall into strictly inorganic or organic classifications. Though they are similar to inclusion compounds, in fact are a type of inclusion compound, clathrates are generally more through in their inclusion propensities.

"The existence of such compounds was recorded as early as 1886 when Mylius observed interesting and intriguing features in the complex compounds formed by hydroquinone with certain volatile substances. He suggested that no ordinary combination occurred between the molecules which formed the complexes, and that in some way the molecules of one component were able to lock the molecules of the second component into position, but without chemical bonding."

Picric acid is a relatively stable explosive available in relatively pure form as a regular article of commerce and which can be shipped and handled with safety. As such, it forms a desirable and economical starting point for the preparation of new explosives.

This invention relates to a new series of basic lead picrate double salts which are readily prepared from picric acid by following simple manufacturing procedures.

I have discovered that when I dissolve picric acid, and in succession add thereto appropriate quantities of sodium hydroxide and a suitable soluble lead salt, I can form a double salt of basic lead picrate and the lead compound in which the ordinarily soluble lead salt is so enclosed in the crystalline structure that it cannot be dissolved or otherwise readily separated from the basic lead picrate.

Several different soluble lead salts are useful in this connection and by their use distinct and different explosives are formed. Similarly, by suitable adjustment of the quantities of the reactants either the mono-basic, di-basic or tri-basic double salts may be formed and again the products are unique and distinct explosive compounds.

FIGURES 1 through 4 are X-ray diffractometer charts showing the results of studies of the exemplary double salt of Example I produced in accordance with this invention with the constituent salts entering into that double salt crystal. In each case the specific material tested is shown beneath the figure number.

Twenty specific examples of the explosives produced in accordance with this invention and procedures for their preparation are set forth in the following examples.

EXAMPLE I

*Mono basic lead picrate·lead acetate*

| Solution Number | Solute | Quantity, gms. | Dissolved in— |
|---|---|---|---|
| I | Picric acid | 23.0 | 250 cc. H₂O. |
| II | Sodium hydroxide | 9.0 | 50 cc. H₂O. |
| III | Lead acetate | 110 | 300 cc. H₂O. |

Add II to I with stirring. Raise temperature to 50–55° C. Add III over a 10 minute period. Hold at 50–55° C. for 30 minutes. Filter, wash and dry.

Yield—60 gms.
Explosion point—300° F. on temperature gradient bar
Static sensitivity—Such that samples would not fire at 4000 v. from 300 mmf. capacitor
Crystal form—Thick yellow plates
Properties—Weak but sensitive primary explosive The composition is mono basic lead picrate·lead acetate and can be represented by the formula

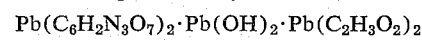

$$Pb(C_6H_2N_3O_7)_2 \cdot Pb(OH)_2 \cdot Pb(C_2H_3O_2)_2$$

EXAMPLE II

*Di basic lead picrate·lead acetate*

| Solution Number | Solute | Quantity, gms. | Dissolved in— |
|---|---|---|---|
| I | Picric acid | 23.0 | 500 cc. H₂O. |
| II | Sodium hydroxide | 18.0 | 100 cc. H₂O. |
| III | Lead acetate | 220 | 600 cc. H₂O. |

Add II to I with stirring. Raise temperature to 50–55° C. Add III over a 10 minute period. Hold at 50–55° C. for 30 minutes. Filter, wash and dry.

Yield—90 gms.
Explosion point—276° C. on temperature gradient bar
Static sensitivity—Such that samples would not fire at 4000 v. from 300 mmf. capacitor
Crystal form—Yellow needles
Properties—Weak sensitive primary explosive The composition is di basic lead picrate·lead acetate and can be represented by the formula

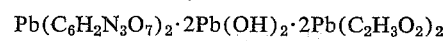

$$Pb(C_6H_2N_3O_7)_2 \cdot 2Pb(OH)_2 \cdot 2Pb(C_2H_3O_2)_2$$

EXAMPLE III

*Tri basic lead picrate·lead acetate*

| Solution Number | Solute | Quantity, gms. | Dissolved in— |
|---|---|---|---|
| I | Picric acid | 23.0 | 900 cc. H₂O. |
| II | Sodium hydroxide | 27.0 | 100 cc. H₂O. |
| III | Lead acetate | 330 | 1,000 cc. H₂O. |

Add II to I with stirring. Raise temperature to 50–55° C. Add III over a period of 10 minutes. Hold at 50–55° C., for 30 minutes. Filter, wash and dry.

Yield—115 gms.
Explosion point—277° C. on temperature gradient bar
Static sensitivity—Such that samples would not fire at 4000 v. from 300 mmf. capacitor
Crystal form—yellow needles
Properties—Weak sensitive primary explosive The composition is tri basic lead picrate·lead acetate and can be represented by the formula $$Pb(C_6H_2N_3O_7)_2 \cdot 3Pb(OH)_2 \cdot 3Pb(C_2H_3O_2)_2$$

EXAMPLE IV $$Pb(C_6H_2N_3O_7)_2 \cdot 3Pb(OH)_2 \cdot 3Pb(C_2H_3O_2)_2$$

| Solution Number | Solute | Quantity, gms. | Dissolved in— |
|---|---|---|---|
| I | Picric acid | 23.0 | 500 cc. H₂O. |
| II | Sodium hydroxide | 9.0 | 100 cc. H₂O. |
| III | Lead formate (dry powder) | 100 | |

Add II to I with stirring. Raise temperature to 70–75° C. Add III (dry powder) over a 15 minute period. Hold at 70–75° C. for 30 minutes. Filter, wash and dry.

Yield—55 gms.
Explosion point—258° C. on temperature gradient bar
Static sensitivity—Such that samples would not fire at 4000 v. from 300 mmf. capacitor
Crystal form—Thin yellow plates
Properties—Weak sensitive primary explosive The composition is mono basic lead picrate·lead formate and can be represented by the formula $$Pb(C_6H_2N_3O_7)_2 \cdot Pb(OH)_2 \cdot Pb(HCO_2)_2$$

EXAMPLE V

*Di basic lead picrate·lead formate*

| Solution Number | Solute | Quantity, gms. | Dissolved in— |
|---|---|---|---|
| I | Picric acid | 23.0 | 900 cc. H₂O. |
| II | Sodium hydroxide | 18.0 | 100 cc. H₂O. |
| III | Lead formate (dry powder) | 200 | |

Add II to I with stirring. Raise temperature to 65–75° C. Add III (dry powder) over a 15 minute period. Hold for 30 minutes at 65–75° C. Filter, wash and dry.
Yield—85 gms.
Explosion point—277° C. on temperature gradient bar
Static sensitivity—Such that samples would not fire at 4000 v. from 300 mmf. capacitor
Crystal form—Thin yellow plates
Properties—Weak sensitive primary explosive The composition is di basic lead picrate·lead formate and can be presented by the formula $$Pb(C_6H_2N_3O_7)_2 \cdot 2Pb(OH)_2 \cdot 2Pb(HCO_2)_2$$

EXAMPLE VI

*Tri basic lead picrate·lead formate*

(1) Add 23.0 gms. of picric acid to 1800 ccs. of water with stirring.
(2) Add 27.0 gms. of sodium hydroxide to 100 ccs. of water stirring continuously.
(3) Mix the two solutions and raise the temperature to 50–55° C.
(4) With stirring add 270 gms. of dry lead formate.
(5) Continue stirring for 30 minutes maintaining temperature.
(6) Filter, wash with water and dry.
Yield 110 gms.

The product is a weak sensitive primary explosive composed of well defined crystals of thin yellow plate form. Its explosion point is 247° C. and its static sensitivity is such that four out of five fire when exposed to a discharge of a 300 mmf. capacitor charged to 4000 volts.

The composition is tri basic lead picrate·lead formate and can be represented by the formula $$Pb(C_6H_2N_3O_7)_2 \cdot 3Pb(OH)_2 \cdot 3Pb(HCO_2)_2$$

EXAMPLE VII

*Mono basic lead picrate·lead propionate*

| Solution Number | Solute | Quantity, gms. | Dissolved in— |
|---|---|---|---|
| I | Picric acid | 23.0 | 250 cc. H₂O. |
| II | Sodium hydroxide | 9.0 | 50 cc. H₂O. |
| III | Lead propionate | 110 | 300 cc. H₂O. |

Add II to I with stirring. Raise temperature to 50–55° C. Add III over a 10 minute period. Hold at 50–55° C. for 30 minutes. Filter, wash and dry.

Yield—63 gms.
Explosion point—291° C. on temperature gradient bar
Static sensitivity—Such that five out of five samples fire at 1000 v. from 300 mmf. capacitor
Crystal form—Yellow amorphous
Properties—Weak sensitive primary explosive The composition is monobasic lead picrate·lead propionate and can be represented by the formula $$Pb(C_6H_2N_3O_7)_2 \cdot Pb(OH)_2 \cdot Pb(C_3H_5O_2)_2$$

EXAMPLE VIII

*Di basic lead picrate·lead propionate*

(1) Add 23.0 gms. of picric acid to 500 ccs. of water with stirring.
(2) Add 18.0 gms. of sodium hydroxide to 100 ccs. of water stirring continuously.
(3) Mix the two solutions and raise the temperature to 50–55° C.
(4) With stirring add 230 gms. of lead propionate in 600 ccs. of water.
(5) Continue stirring for 30 minutes maintaining temperature.
(6) Filter, wash with water and dry.
Yield 95.0 gms.

The product is a powerful sensitive primary explosive composed of well defined crystals of fine yellow needle form. Its explosion point is 265° C. and its static sensitivity is such that five out of five fire when exposed to a discharge of a 300 mmf. capacitor charged to 1000 volts. The composition is di basic lead picrate·lead propionate and can be represented by the formula $$Pb(C_6H_2N_3O_7)_2 \cdot 2Pb(OH)_2 \cdot 2Pb(C_3H_5O_2)_2$$

EXAMPLE IX

*Tri basic lead picrate·lead propionate*

(1) Add 23.0 gms. of picric acid to 900 ccs. of water with stirring.
(2) Add 27.0 gms. of sodium hydroxide to 100 ccs. of water stirring continuously.
(3) Mix two solutions and raise the temperature to 50–55° C.
(4) With stirring add 245.0 gms. of lead propionate in 1000 ccs. of water.
(5) Continue stirring for 30 minutes maintaining temperature.
(6) Filter, wash with water and dry.
Yield 140.0 gms.

The product is a weak sensitive primary explosive composed of well defined crystals of fine yellow needle form. Its explosion point is 255° C. and its static sensitivity is such that five out of five fire when exposed to a discharge of a 300 mmf. capacitor charged to 3000 volts.

The composition is tri basic lead picrate·lead propionate and can be represented by the formula $$Pb(C_6H_2N_3O_7)_2 \cdot 3Pb(OH)_2 \cdot 3Pb(C_3H_5O_2)_2$$

EXAMPLE X

*Mono basic lead picrate·lead lactate*

(1) Add 23.0 gms. of picric acid to 300 ccs. of water with stirring.
(2) Add 8.5–9.5 gms. of sodium hydroxide to 50 ccs. of water stirring continuously.
(3) Mix the two solutions and raise the temperature to 50–50° C.
(4) With stirring add 100.0 gms. of lead lactate in 300 ccs. of water.
(5) Continue stirring for 30 minutes maintaining temperature.
(6) Filter, wash with water and dry.
Yield approximately 55.0 gms.

The product is a powerful primary explosive composed of well defined crystals of thin yellow plate form. Its explosive point is 276° C. and its static sensitivity is such that five of five fired when exposed to a discharge of 300 mmf. capacitor charged to 4000 volts.

The composition is mono basic lead picrate·lead lactate and can be represented by the formula $$Pb(C_6H_2N_3O_7)_2 \cdot Pb(OH)_2 \cdot Pb(C_3H_5O_3)_2$$

EXAMPLE XI

*Di basic lead picrate·lead lactate*

(1) Add 23.0 gms. of picric acid to 600 ccs. of water with stirring.
(2) Add 17.0–19.0 gms. of sodium hydroxide to 100 ccs. of water stirring continuously.
(3) Mix the two solutions and raise the temperature to 50–55° C.
(4) With stirring add 220 gms. of lead lactate in 600 ccs. of water.
(5) Continue stirring for 30 minutes maintaining temperature.
(6) Filter, wash with water and dry.
Yield approximately 90.0 gms.

The product is a powerful primary explosive composed of well defined crystals of thin yellow plate form. Its explosion point is 263° C. and its static sensitivity is such that three of five fired when exposed to a discharge of a 300 mmf. capacitor charged to 4000 volts.

The composition is di basic lead picrate·lead lactate and can be represented by the formula $$Pb(C_6H_2N_3O_7)_2 \cdot 2Pb(OH)_2 \cdot 2Pb(C_3H_5O_3)_2$$

EXAMPLE XII

*Mono basic lead picrate·lead acrylate*

(1) Add 23.0 gms. to picric acid to 600 ccs. of water with stirring.
(2) Add 8.5–9.5 gms. of sodium hydroxide to 50 ccs. of water stirring continuously.
(3) Mix the two solutions and raise the temperature to 60–65° C.
(4) With stirring add 90.0 gms. of dry lead acrylate.
(5) Continue stirring for 30 minutes maintaining temperature.
(6) Filter, wash with water and dry.
Yield approximately 55 gms.

The product is a mild primary explosive composed of well defined crystals of yellow-orange parallelopiped form. Its explosion point is 268° C. and its static sensitivity is such that it would not fire when exposed to a discharge of a 300 mmf. capacitor charged to 4000 volts.

The composition is mono basic lead picrate·lead acrylate and can be represented by the formula $$Pb(C_6H_2N_3O_7)_2 \cdot Pb(OH)_2 \cdot Pb(C_3H_3O_2)_2$$

EXAMPLE XIII

*Di basic lead picrate·lead acrylate*

(1) Add 23.0 gms. of picric acid to 1000 ccs. of water with stirring.
(2) Add 17.0–19.0 gms. of sodium hydroxide to 100 ccs. of water stirring continuously.
(3) Mix the two solutions and raise the temperature to 60–65° C.
(4) With stirring add 180 gms. of dry lead acrylate.
(5) Continue stirring for 30 minutes maintaining temperature.
(6) Filter, wash with water and dry.
Yield approximately 90 gms.

The product is a very weak primary explosive composed of well defined crystals of yellow-orange rectangular parallelopiped form. Its explosion point is 261° C. and its static sensitivity is such that it would not fire when exposed to a discharge of a 300 mmf. capacitor charged to 4000 volts.

The composition is di basic lead picrate·lead acrylate and can be represented by the formula $$Pb(C_6H_2N_3O_7)_2 \cdot 2Pb(OH)_2 \cdot 2Pb(C_3H_3O_2)_2$$

EXAMPLE XIV

*Tri basic lead picrate·lead acrylate*

(1) Add 23.0 gms. of picric acid to 2000 ccs. of water with stirring.
(2) Add 25.5–28.5 gms. of sodium hydroxide to 200 ccs. of water stirring continuously.
(3) Mix the two solutions and raise the temperature to 60–65° C.
(4) With stirring add 270 gms. of dry lead acrylate.
(5) Continue stirring for 30 minutes maintaining temperature.
(6) Filter, wash with water and dry.
Yield approximately 115 gms.

The product is a very weak primary explosive composed of well defined crystals of yellow needle form. Its explosion point is 254° C. and its static sensitivity is such that four of five fired when exposed to a discharge of a 300 mmf. capacitor charged to 4000 volts.

The composition is tri basic lead picrate·lead acrylate and can be represented by the formula $$Pb(C_6H_2N_3O_7)_2 \cdot 3Pb(OH)_2 \cdot 3Pb(C_3H_3O_2)_2$$

EXAMPLE XV

*Mono basic lead picrate·lead methacrylate*

(1) Add 23.0 gms. of picric acid to 600 ccs. of water with stirring.
(2) Add 8.5–9.5 gms. of sodium hydroxide to 50 ccs. of water stirring continuously.
(3) Mix the two solutions and raise the temperature to 60–65° C.
(4) With stirring add 80 gms. of dry lead methacrylate.
(5) Continue stirring for 30 minutes maintaining temperature.
(6) Filter, wash with water and dry.
Yield approximately 55 gms.

The product is a powerful primary explosive composed of well defined crystals of thick orange plate form. Its explosion point is 268° C. and its static sensitivity is such that four of five fired when exposed to a discharge of a 300 mmf. capacitor charged to 4000 volts.

The composition is mono basic lead picrate·lead methacrylate and can be represented by the formula $$Pb(C_6H_2N_3O_7)_2 \cdot Pb(OH)_2 \cdot Pb(C_4H_5O_2)_2$$

EXAMPLE XVI

*Di basic lead picrate·lead methacrylate*

(1) Add 23.0 gms. of picric acid to 1000 ccs. of water with stirring.
(2) Add 17.0–19.0 gms. of sodium hydroxide to 100 ccs. of water stirring continuously.
(3) Mix the two solutions and raise the temperature to 60–65° C.
(4) With stirring add 160 gms. of dry lead methacrylate.
(5) Continue stirring for 30 minutes maintaining temperature.
(6) Filter, wash with water and dry.
Yield approximately 90 gms.

The product is a weak primary explosive composed of well defined crystals of yellow needle form. Its explosion point is 278° C. and its static sensitivity is such that five of five fired when exposed to a discharge of a 300 mmf. capacitor charged to 3000 volts.

The composition of di basic lead picrate·lead methacrylate and can be represented by the formula $$Pb(C_6H_2N_3O_7)_2 \cdot 2Pb(OH)_2 \cdot 2Pb(C_4H_5O_2)_2$$

EXAMPLE XVII

*Tri basic lead picrate·lead methacrylate*

(1) Add 23.0 gms. of picric acid to 2000 ccs. of water with stirring.
(2) Add 25.5–28.5 gms. of sodium hydroxide to 200 ccs. of water stirring continuously.
(3) Mix the two solutions and raise the temperature to 60–65° C.
(4) With stirring add 240 gms. of dry lead methacrylate.
(5) Continue stirring for 30 minutes maintaining temperature.
(6) Filter, wash with water and dry.
Yield approximately 115 gms.

The product is a very weak primary explosive composed of well defined crystals of yellow needle form. Its explosion point is 283° C. and its static sensitivity is such that five of five fired when exposed to a discharge of a 300 mmf. capacitor charged to 1000 volts.

The composition is tri basic lead picrate·lead methacrylate and can be represented by the formula $$Pb(C_6H_2N_3O_7)_2 \cdot 3Pb(OH)_2 \cdot 3Pb(C_4H_5O_2)_2$$

EXAMPLE XVIII

*Mono basic lead picrate·lead aminoacetate*

(1) Add 23.0 gms. of picric acid to 600 ccs. of water with stirring.
(2) Add 8.5–9.5 gms. of sodium hydroxide to 50 ccs. of water stirring continuously.
(3) Mix the two solutions and raise the temperature to 55° C.
(4) With stirring add 80.0 gms. of dry lead aminoacetate.
(5) Continue stirring for 30 minutes maintaining temperature.
(6) Filter, wash with water and dry.
Yield 60 gms.

The product is a powerful primary explosive composed of well defined crystals of orange plate form. Its explosion point is 274° C. and its static sensitivity is such that five out of five fire when exposed to a discharge of 300 mmf. capacitor charged to 1000 volts.

The composition is mono basic lead picrate·lead aminoacetate and can be represented by the formula $$Pb(C_6H_2N_3O_7)_2 \cdot Pb(OH)_2 \cdot Pb(C_2H_4NO_2)_2$$

EXAMPLE XIV

*Di basic lead picrate·lead aminoacetate*

(1) Add 23.0 gms. of picric acid to 1200 ccs. of water with stirring.
(2) Add 17.0–19.0 gms. of sodium hydroxide to 100 ccs. of water stirring continuously.
(3) Mix the two solutions and raise the temperature to 55° C.
(4) With stirring add 160 gms. of dry lead aminoacetate.
(5) Continue stirring for 30 minutes maintaining temperature.
(6) Filter, wash with water and dry.
Yield 95 gms.

The product is a weak primary explosive composed of well defined crystals of orange plate form. Its explosion point is 216° C. and its static sensitivity is such that two out of five fire when exposed to a discharge of a 300 mmf. capacitor charged to 4000 volts.

The composition is di basic lead picrate·lead aminoacetate and can be represented by the formula $$Pb(C_6H_2N_3O_7)_2 \cdot 2Pb(OH)_2 \cdot 2Pb(C_2H_4NO_2)_2$$

EXAMPLE XX

*Tri basic lead picrate·lead aminoacetate*

(1) Add 23.0 gms. of picric acid to 1500 ccs. of water with stirring.
(2) Add 25.5–28.5 gms. of sodium hydroxide to 150 ccs. of water stirring continuously.
(3) Mix the two solutions and raise the temperature to 55° C.
(4) With stirring add 240 gms. of dry lead aminoacetate.
(5) Continue stirring for 30 minutes maintaining temperature.
(6) Filter, wash with water and dry.
Yield 115 gms.

The product is a very weak primary explosive composed of well defined crystals of orange plate agglomerates. Its explosion point is 219° C. and its static sensitivity is such that four out of five fire when exposed to a discharge of a 300 mmf. capacitor charged to 4000 volts.

The composition is tri basic lead picrate·lead aminoacetate and can be represented by the formula $$Pb(C_6H_2N_3O_7)_2 \cdot 3Pb(OH)_2 \cdot 3Pb(C_2H_4NO_2)_2$$

The examples listed above are intended as illustrative and not as limited or indicative that only these specific explosives can be formed.

It will be noted that each of the specific examples produces a primary explosive which is a double salt of basic lead picrate and another lead salt of a monobasic acid of no greater strength than picric acid which lead salt is introduced into the reaction as a combining and precipitating agent and which is by itself more soluble under the conditions of the reaction than the double salt which is precipitated as the end product of the reaction. This last qualification on the solubility of the precipitating lead salt is met by any lead salt of such a monobasic acid, one part of which can be dissolved in one hundred parts of water.

Considering the various specific examples, it will be seen that essentially identical processes are utilized to produce each of the explosives. This comparison is facilitated by choosing for the specific examples the laboratory scale processes, each starting with the same quantity of picric acid.

It will be seen that each of the processes requires adding the desired amount of picric acid to water, where the picric acid will in part dissolve and in part may be kept in suspension by continued stirring.

To the picric acid in water there is added, for each gram mole of picric acid, in excess of (2) gram moles of sodium hydroxide with continued stirring and the temperature is raised as indicated in the various specific examples.

To the solution formed above there is added, slowly and with continued heat and stirring, for each gram mole of picric acid, in excess of (2) gram moles of a lead salt of a monobasic acid of no greater strength than picric acid, which lead salt is, under the conditions of the reaction, more soluble than the double salt it is desired to precipitate. This lead salt reacts with the solution and results in the formation of a double salt which is insoluble in the solution in which it is formed and will by the end of the indicated time period be substantially completely precipitated therein.

The precipitate may then be separated by filtering it out of the solution, washing, and drying.

The reaction generally proceeds faster and to a greater degree of completeness if all reactants but picric acid are present in slightly greater amounts than the theoretically indicated gram-mole amounts. If the excess is only slightly more than that indicated above, a monobasic double salt will be precipitated. The use of slightly in excess of double or triple the proportions of all of the reactants except picric acid will result, respectively, in the precipitation of dibasic and tribasic double salts.

It may be noted that in some instances, I have preferred to add the combining and precipitating lead salt as a dry powder, rather than as a water solution. In these cases the lead salt is one which would be completely soluble only in an inconveniently large volume of water and in such a dilute solution the reaction would tend to proceed with undesirable slowness. However, the dry powder is more soluble under the conditions of the reaction than the double salt to be precipitated and when stirred into the heated solution the reaction proceeds and the double salt is precipitated. Examples of the lead salts which are best added in dry powder form are acrylate, methacrylate, formate and aminoacetate. Where I have indicated before that any of those lead salts of monobasic acids of no greater acid strength than picric acid are useful if they are soluble to the extent that one part of the lead salt may be dissolved in one hundred parts of water, if the lead salt is not so soluble that about one part will dissolve in about fifteen parts of water, it is preferable to add it as a dry powder.

The formulas shown are not intended to indicate or to infer that a definite structural formula has been or can be written for any of these salt complexes for, as noted, the clathrates appear to disdain the previously accepted types of chemical bonding. Ultimate chemical analyses of the resulting complex salts are in close agreement with the indicated formulas and with the quantities of the materials used to produce the complex salts so that the indicated formulas accurately represent the relative proportions of the molecules included.

That the double salt products disclosed are true compounds, rather than mixtures is indicated by the following:

Each of the procedures set forth is invariably reproducible under varying conditions and with various quantities of the materials ranging from micro-scale laboratory samples to plant scale batches of many pounds, to always produce the same product.

By visual and microscopic study of the double salt products, it has been determined that each of the specific examples precipitates in a characteristic crystal form. It may be noted that each of the lead salts included in the complex crystals with lead picrate is by itself a white or colorless powder of amorphous or fine crystalline form. Close visual and microscopic observation of the double salt crystals produced in accordance with this invention fails to reveal any trace of any material corresponding to such materials as lead hydroxide, lead acetate, lead formate, lead propionate, lead lactate, lead acrylate, lead methacrylate, or lead aminoacetate yet elemental chemical analysis of each of the double salt crystals confirms the presence of these substances in the double salt crystals and it has been determined that the equivalent amount of material has been consumed in the solution from which the double salts have been precipitated.

From a study of solubility data it has been determined that all of the lead salts combined with lead picrate in the double salt crystals are to some extent water soluble. In each specific example, the double salt crystals were precipitated out of solution and are, as the final step of the process, separated by filtration and by washing and drying. If the soluble lead salts were not bound up by inclusion within the molecular structure of a host compound they would inevitably be leached out to some extent in the washing and drying of the product and the composition of the end product would vary as a function of the amount of washing but this does not take place.

With each of the specific examples, the explosive properties and static sensitivity of the particular double salt have been listed. These characteristics, like crystalline structure are part of the identification of a particular explosive and although all of the double salts listed in the specific examples are primary explosives in the sense that they can be initiated by shock or friction, they vary rather widely in their explosive characteristics when comparing one double salt to another but are consistently reproducible from sample to sample of the same double salt.

In the drawing, the X-ray diffractometer charts have been reproduced for the double salt basic lead picrate·lead acetate (FIG. 1) as well as for normal lead picrate (FIG. 2), lead hydroxide (FIG. 3) and lead acetate (FIG. 4) which can be regarded as the constituents of this double salt. As those skilled in the art will realize, if the double salt was simply a mixture of the three ingredients, the X-ray diffractometer chart for the double salt would be a composite or jumble showing the characteristic peaks for each of the constituent salts. Instead the double salt diffractometer chart shows a clean trace characterizing the double salt basic lead picrate·lead acetate and no other material. Although this illustration could be repeated for each of the double salts disclosed in this application it is believed unnecessary to encumber the application with such a multitude of illustrations.

I claim:
1. A method of forming a complex double salt of basic lead picrate, comprising the steps of:
(I) Dissolving and suspending in water a predetermined amount of picric acid
(II) Reacting with the solution and suspension of picric acid, for each gram mole of picric acid, slightly in excess of any multiple up to three of two gram moles of sodium hydroxide
(III) Adding, with heat and stirring, as a combining and precipitating agent, for each gram mole of picric acid, in excess of the same multiple of two gram moles of a lead salt selected from the group of lead salts consisting of lead acetate, lead lactate, lead methacrylate, lead acrylate, lead propionate, lead formate and lead amino-acetate (IV) Continuing the stirring until an insoluble complex salt is precipitated (V) Separating the complex double salt by washing the precipitate.

2. A method of forming a complex double salt of basic lead picrate, comprising the steps of:
(I) Dissolving and suspending in water a predetermined amount of picric acid
(II) Reacting with the solution and suspension of picric acid, for each gram mole of picric acid, slightly in excess of any multiple up to three of two gram moles of sodium hydroxide
(III) Adding, with heat and stirring, as a combining and precipitating agent, for each gram mole of picric acid, in excess of the same multiple of two gram moles of lead acetate
(IV) Continuing the stirring until an insoluble complex salt is precipitated
(V) Separating the complex double salt by washing the precipitate.

3. A method of forming a complex double salt of basic lead picrate, comprising the steps of:
(I) Dissolving and suspending in water a predetermined amount of picric acid
(II) Reacting with the solution and suspension of picric acid, for each gram mole of picric acid, slightly in excess of any multiple up to three of two gram moles of sodium hydroxide
(III) Adding, with heat and stirring, as a combining and precipitating agent, for each gram mole of picric acid, in excess of the same multiple of two gram moles of lead lactate
(IV) Continuing the stirring until an insoluble complex salt is precipitated
(V) Separating the complex double salt by washing the precipitate.

4. A method of forming a complex double salt of basic lead picrate, comprising the steps of:
(I) Dissolving and suspending in water a predetermined amount of picric acid
(II) Reacting with the solution and suspension of picric acid, for each gram mole of picric acid, slightly in excess of any multiple up to three of two gram moles of sodium hydroxide
(III) Adding, with heat and stirring, as a combining and precipitating agent, for each gram mole of picric acid, in excess of the same multiple of two gram moles of lead acrylate
(IV) Continuing the stirring until an insoluble complex salt is precipitated
(V) Separating the complex double salt by washing the precipitate.

5. A method of forming a complex double salt of basic lead picrate, comprising the steps of:
(I) Dissolving and suspending in water a predetermined amount of picric acid
(II) Reacting with the solution and suspension of picric acid, for each gram mole of picric acid, slightly in excess of any multiple up to three of two gram moles of sodium hydroxide
(III) Adding, with heat and stirring, as a combining and precipitating agent, for each gram mole of picric acid, in excess of the same multiple of two gram moles of lead methacrylate
(IV) Continuing the stirring until an insoluble complex salt is precipitated
(V) Separating the complex double salt by washing the precipitate.

6. A method of forming a complex double salt of basic lead picrate, comprising the steps of:
(I) Dissolving and suspending in water a predetermined amount of picric acid
(II) Reacting with the solution and suspension of picric acid, for each gram mole of picric acid, slightly in excess of any multiple up to three of two gram moles of sodium hydroxide
(III) Adding, with heat and stirring, as a combining and precipitating agent, for each gram mole of picric acid, in excess of the same multiple of two gram moles of lead propionate
(IV) Continuing the stirring until an insoluble complex salt is precipitated
(V) Separating the complex double salt by washing the precipitate.

7. A method of forming a complex double salt of basic lead picrate, comprising the steps of:
(I) Dissolving and suspending in water a predetermined amount of picric acid
(II) Reacting with the solution and suspension of picric acid, for each gram mole of picric acid, slightly in excess of any multiple up to three of two gram moles of sodium hydroxide
(III) Adding, with heat and stirring, as a combining and precipitating agent, for each gram mole of picric acid, in excess of the same multiple of two gram moles of lead formate
(IV) Continuing the stirring until an insoluble complex salt is precipitated
(V) Separating the complex double salt by washing the precipitate.

8. A method of forming a complex double salt of basic lead picrate, comprising the steps of:
(I) Dissolving and suspending in water a predetermined amount of picric acid
(II) Reacting with the solution and suspension of picric acid, for each gram mole of picric acid, slightly in excess of any multiple up to three of two gram moles of sodium hydroxide
(III) Adding, with heat and stirring, as a combining and precipitating agent, for each gram mole of picric acid, in excess of the same multiple of two gram moles of lead amino-acetate
(IV) Continuing the stirring until an insoluble complex salt is precipitated
(V) Separating the complex double salt by washing the precipitate.

9. A method of forming a complex double salt of monobasic lead picrate, comprising the steps of:
(I) Dissolving and suspending in water a predetermined amount of picric acid
(II) Reacting with the solution and suspension of picric acid, for each gram mole of picric acid, slightly in excess of two gram moles of sodium hydroxide
(III) Adding, with heat and stirring, as a combining and precipitating agent, for each gram mole of picric acid, in excess of two gram moles of a lead salt selected from the group of lead salts consisting of lead acetate, lead lactate, lead acrylate, lead methacrylate, lead propionate, lead formate and lead amino-acetate
(IV) Continuing the stirring until an insoluble complex salt is precipitated
(V) Separating the complex double salt by washing the precipitate.

10. A method of forming a complex double salt of dibasic lead picrate, comprising the steps of:
(I) Dissolving and suspending in water a predetermined amount of picric acid
(II) Reacting with the solution and suspension of picric acid, for each gram mole of picric acid, slightly in excess of four gram moles of sodium hydroxide
(III) Adding, with heat and stirring, as a combining and precipitating agent, for each gram mole of picric acid, in excess of four gram moles of a lead salt selected from the group of lead salts consisting of lead acetate, lead lactate, lead acrylate, lead methacrylate, lead propionate, lead formate and lead amino-acetate (IV) Continuing the stirring until an insoluble complex salt is precipitated (V) Separating the complex double salt by washing the precipitate.

11. A method of forming a complex double salt of tribasic lead picrate, comprising the steps of:
(I) Dissolving and suspending in water a predetermined amount of picric acid
(II) Reacting with the solution and suspension of picric acid, for each gram mole of picric acid, slightly in excess of six gram moles of sodium hydroxide
(III) Adding, with heat and stirring, as a combining and precipitating agent, for each gram mole of picric acid, in excess of six gram moles of a lead salt selected from the group of lead salts consisting of lead acetate, lead lactate, lead acrylate, lead methacrylate, lead propionate, lead formate and lead amino-acetate
(IV) Continuing the stirring until an insoluble complex salt is precipitated
(V) Separating the complex double salt by washing the precipitate.

12. A complex double salt combining in characteristic crystalline form definite proportions of basic lead picrate, and a combining and precipitating lead salt selected from the group of lead salts of monobasic acids of no greater acid strength than picric acid consisting of lead acetate, lead lactate, lead acrylate, lead methacrylate, lead propionate, lead formate and lead amino-acetate in which there are present for each molecule of lead picrate, any multiple of molecules of lead hydroxide up to three and the same multiple of molecules of the selected lead salt.

13. A double salt as defined in claim 12, wherein said basic lead picrate is mono basic lead picrate, in which there are present for each molecule of lead picrate one molecule of lead hydroxide and one molecule of the selected lead salt.

14. A doublt salt as defined in claim 12, wherein said basic lead picrate is di basic lead picrate, in which there are present for each molecule of lead picrate two molecules of lead hydroxide and two molecules of the selected lead salt.

15. A double salt as defined in claim 12, wherein said basic lead picrate is tribasic lead picrate, in which there are present for each molecule of lead picrate three molecules of lead hydroxide and three molecules of the selected lead salt.

16. The double salt monobasic lead picrate·lead formate, in which there are present for each molecule of lead picrate one molecule of lead hydroxide and one molecue of lead formate.

17. The double salt monobasic lead picrate·lead acetate, in which there are present for each molecule of lead picrate one molecule of lead hydroxide and one molecue of lead acetate.

18. The double salt monobasic lead picrate·lead propionate, in which there are present for each molecule of lead picrate one molecule of lead hydroxide and one molecule of lead propionate.

19. The double salt monobasic lead picrate·lead lactate, in which there are present for each molecule of lead picrate one molecule of lead hydroxide and one molecule of lead lactate.

20. The double salt monobasic lead picrate·lead acrylate, in which there are present for each molecule of lead picrate one molecule of lead hydroxide and one molecule of lead acrylate.

21. The double salt monobasic lead picrate·lead methacrylate, in which there are present for each molecule of lead picrate one molecule of lead hydroxide and one molecule of lead methacrylate.

22. The double salt monobasic lead picrate lead amino-acetate, in which there are present for each molecule of lead picrate one molecule of lead hydroxide and one molecule of lead amino acetate.

23. The doublt salt dibasic lead picrate·lead formate, in which there are present for each molecule of lead picrate two molecules of lead hydroxide and two molecules of lead formate.

24. The double salt dibasic lead picrate·lead acetate, in which there are present for each molecule of lead picrate two molecules of lead hydroxide and two molecules of lead acetate.

25. The double salt dibasic lead picrate lead propionate, in which there are present for each molecule of lead picrate two molecules of lead hydroxide and two molecules of lead proprionate.

26. The double salt dibasic lead picrate·lead lactate, in which there are present for each molecule of lead picrate two molecules of lead hydroxide and two molecules of lead lactate.

27. The double salt dibasic lead picrate·lead acrylate, in which there are present for each molecule of lead picrate two molecules of lead hydroxide and two molecules of lead acrylate.

28. The double salt dibasic lead picrate·lead methacrylate, in which there are present for each molecule of lead picrate two molecules of lead hydroxide and two molecules of lead methacrylate.

29. The doublt salt dibasic lead picrate·lead amino-acetate, in which there are present for each molecule of lead picrate two molecules of lead hydroxide and two molecules of lead amino-acetate.

30. The double salt tribasic lead picrate·lead formate, in which there are present for each molecule of lead picrate three molecules of lead hydroxide and three molecules of lead formate.

31. The double salt tribasic lead picrate·lead acetate, in which there are present for each molecule of lead picrate three molecules of lead hydroxide and three molecules of lead acetate.

32. The double salt tribasic lead picrate·lead propionate, in which there are present for each molecule of lead picrate three molecules of lead hydroxide and three molecules of lead propionate.

33. The double salt tribasic lead picrate·lead acrylate, in which there are present for each molecule of lead picrate three molecules of lead hydroxide and three molecules of lead acrylate.

34. The double salt tribasic lead picrate·lead methacrylate, in which there are present for each molecule of lead picrate three molecules of lead hydroxide and three molecules of lead methacrylate.

35. The double salt tribasic lead picrate·lead amino-acetate, in which there are present for each molecule of lead picrate three molecules of lead hydroxide and three molecules of lead amino-acetate.

References Cited by the Examiner

UNITED STATES PATENTS

| | | | |
|---|---|---|---|
| 1,900,157 | 3/1933 | Burns | 149—26 |
| 2,116,878 | 5/1938 | Brun | 149—24 |
| 2,205,116 | 6/1940 | Brun | 149—25 |
| 2,226,391 | 12/1940 | Rubenstein | 260—435 |
| 2,295,104 | 9/1942 | Garfield | 260—435 |
| 2,415,917 | 2/1947 | Stewart | 260—435 |
| 2,969,638 | 1/1961 | Sammons | 149—24 |

FOREIGN PATENTS

| | | |
|---|---|---|
| 679,064 | 7/1939 | Germany. |
| 192,830 | 2/1923 | Great Britain. |

TOBIAS E. LEVOW, *Primary Examiner.*

E. C. BARTLETT, H. M. S. SNEED,
*Assistant Examiners.*